(12) United States Patent
Rynbeck

(10) Patent No.: US 7,380,676 B2
(45) Date of Patent: Jun. 3, 2008

(54) FILTERING DEVICE

(75) Inventor: Colin James Rynbeck, Perth (AU)

(73) Assignee: Winchester Global Pty Ltd, West Perth, Western Australia (AU)

( * ) Notice: Subject to any disclaimer, the term of this patent is extended or adjusted under 35 U.S.C. 154(b) by 158 days.

(21) Appl. No.: 10/399,598

(22) PCT Filed: Oct. 18, 2001

(86) PCT No.: PCT/AU01/01306

§ 371 (c)(1), (2), (4) Date: Apr. 17, 2003

(87) PCT Pub. No.: WO02/32541

PCT Pub. Date: Apr. 25, 2002

(65) Prior Publication Data

US 2004/0020844 A1    Feb. 5, 2004

(51) Int. Cl.
B01D 35/30    (2006.01)
(52) U.S. Cl. .................. 210/446; 210/450; 210/455; 210/494.1; 210/497.01
(58) Field of Classification Search ............ 210/488, 210/494.3, 497.1, 500.1, 503–508, 497.01, 210/446, 450; 96/135; 55/521, 527, 528; 162/109; 428/179
See application file for complete search history.

(56) References Cited

U.S. PATENT DOCUMENTS

| | | | |
|---|---|---|---|
| 2,537,898 A | 1/1951 | Hunter et al. | |
| 3,198,336 A | 8/1965 | Hyslop | |
| 3,414,459 A | 12/1968 | Wells | |
| 4,017,400 A * | 4/1977 | Schade | 210/439 |
| 4,661,255 A * | 4/1987 | Aumann et al. | 210/491 |
| 4,671,983 A * | 6/1987 | Burt | 428/179 |
| 5,080,791 A | 1/1992 | Sims | |
| 5,120,331 A | 6/1992 | Landy | |
| 5,178,753 A * | 1/1993 | Trabold | 210/130 |
| 5,520,778 A | 5/1996 | Sawdai | |
| 5,846,636 A | 12/1998 | Ruppel et al. | |
| 6,171,684 B1 * | 1/2001 | Kahlbaugh et al. | 428/212 |
| 6,379,437 B1 * | 4/2002 | Heinonen et al. | 96/135 |
| 6,874,642 B1 * | 4/2005 | Malecot et al. | 210/435 |

FOREIGN PATENT DOCUMENTS

| | | |
|---|---|---|
| JP | 54 67866 | 10/1977 |
| JP | 9 220415 | 2/1996 |
| JP | 2000 354713 | 12/2000 |
| WO | WO 97/40910 | * 11/1997 |

* cited by examiner

*Primary Examiner*—Joseph Drodge
(74) *Attorney, Agent, or Firm*—Gerald E. Helget; Nelson R. Capes; Briggs and Morgan, P.A.

(57) ABSTRACT

A filtering device (10) comprises a plurality of layers of paper (40). The paper (40) is formed with projections (120)) so that cavities (122) are located between adjacent layers of paper (40). A liquid being filtered passes between adjacent layers, filling at least some of the cavities (122).

18 Claims, 4 Drawing Sheets

FILTERING DEVICE

FIELD OF THE INVENTION

The present invention relates to a filtering device.

It is known to require filtering devices mounted to engines in order to filter contaminants, small particles and moisture from oil and or fuel used in the engines. A common type of filtering device used for this purpose is constructed from folded cardboard through which the oil or fuel is required to pass.

Another type of filtering device is known as an edge-on filter. This type of filtering device consists of a roll of paper. The oil or fuel passes along the roll of paper, with contaminants and small particles being held between the sheets of paper. Known edge-on filters are not capable of removing a significant amount of moisture from the fuel or oil passing through them. Known papers used in edge-on filters have also been found to leech contaminants remaining from the paper manufacturing process into the substance being filtered, thus reducing the effectiveness of the filtration.

The present invention attempts to overcome at least in part some of the aforementioned disadvantages of previous filtering devices.

SUMMARY OF THE INVENTION

In accordance with one aspect of the present invention there is provided a filtering device comprising a plurality of layers of paper, characterised in that the paper has a surface formed with projections such that the projections cause a plurality of cavities to be located between adjacent layers, the filtering device having a first end and a second end with the layers of paper being aligned between the first end and the second end, and the filtering device being arranged to allow a liquid substance to pass layers from the first end to the second end, the liquid substance passing through at least some of the cavities as it passes from the first end to the second end.

BRIEF DESCRIPTION OF THE DRAWINGS

The present invention will now be described, by way of example, with reference to the accompanying drawings, in which.

DESCRIPTION OF THE INVENTION

Figure 1:
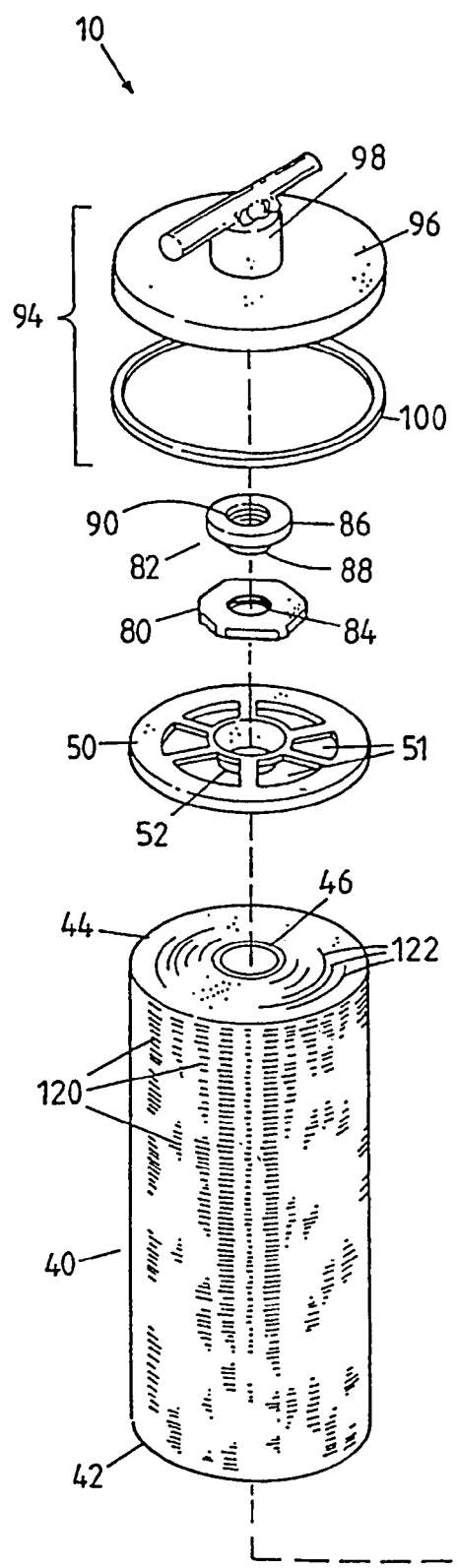
FIG. 1 is an exploded view of a filtering device in accordance with the present invention.
Figure 1:
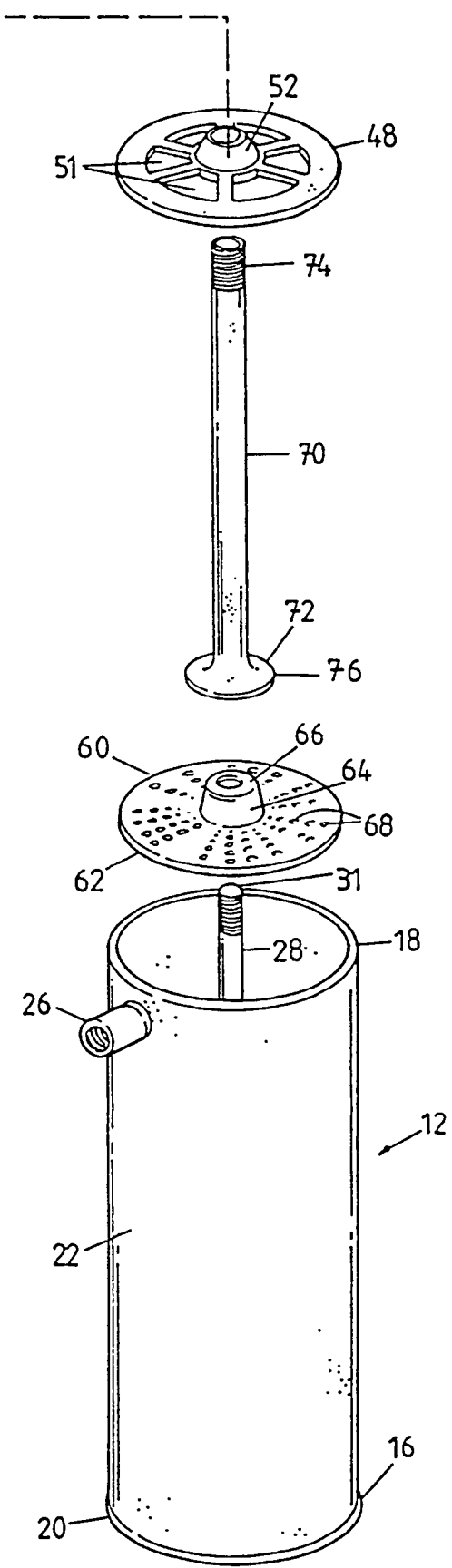
Figure 2:
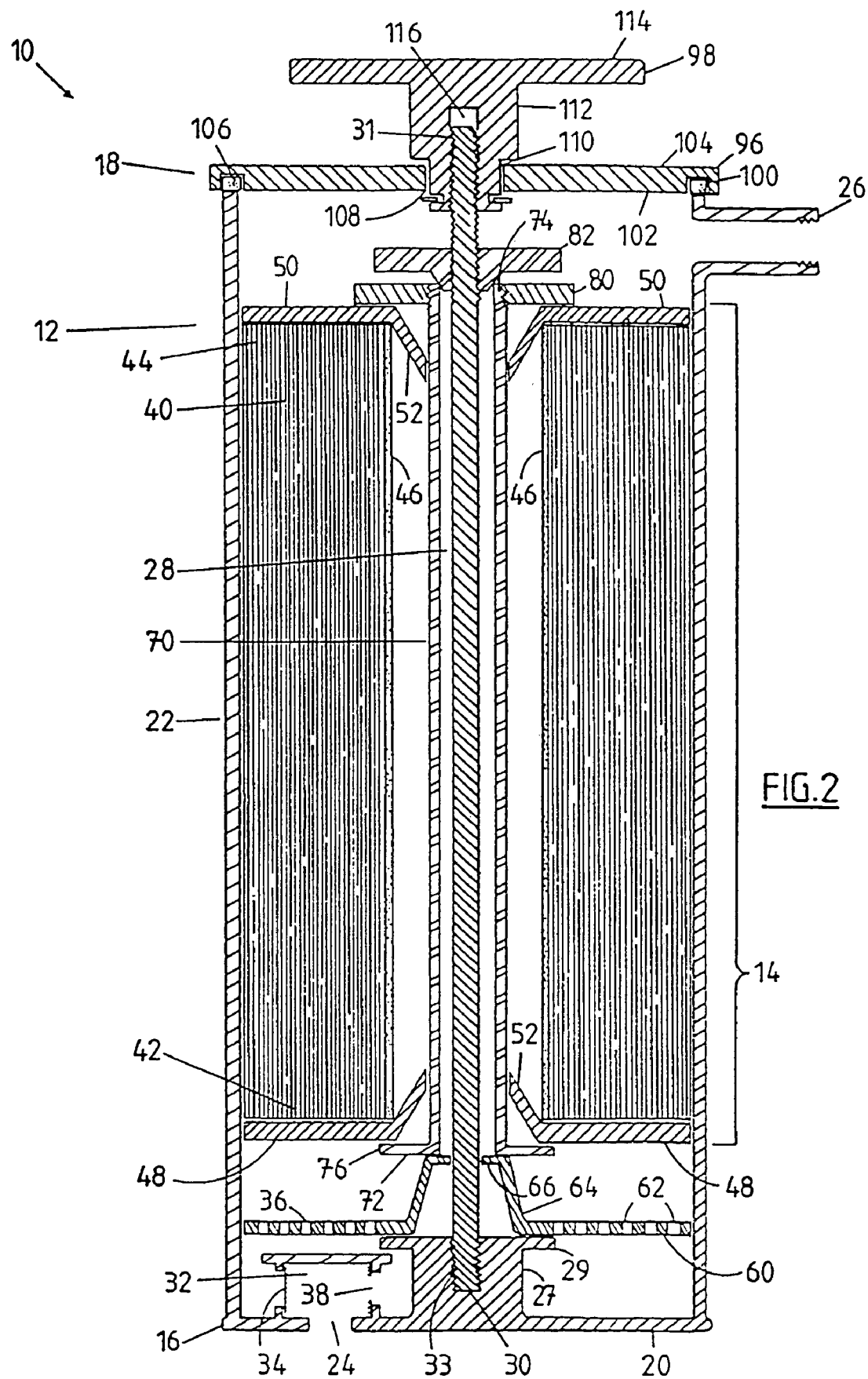
FIG. 2 is a cross sectional view of the filtering device of FIG. 1 shown in its assembled condition.

It will be appreciated that although the embodiment shown is arranged as a filter for fuel, the invention is also envisaged in an alternative embodiment as a filter for oil.

Referring to the Figures, there is shown a filtering device 10 comprising a housing 12 and a filtering portion 14. The housing 12 is substantially cylindrical in shape, and includes a substantially circular base portion 20 at a first end 16 of the housing 12 and a substantially cylindrical side wall 22. The housing 12 includes a fuel inlet 24 in the form of an aperture in the base portion 20, and a fuel outlet 26 in the form of a hollow cylindrical portion extending from the side wall 22 near a second end 18 of the housing 12.

The base portion 20 includes a centrally disposed substantially cylindrical projection 27. The projection 27 extends from the base portion 20 internally of the housing 12. The projection 27 includes a radial lip portion 29 disposed about the projection 27 at an end thereof remote from the base portion 20.

The housing 12 further includes a cylindrical shaft 28 disposed centrally of the housing 12, extending from a first end 30 attached to the centre of the projection 27 to a second end 31 extending past the second end 18 of the housing 12. The cylindrical shaft is externally threaded at the first end 30 and the second end 31. The projection 27 includes an internally threaded aperture 33 into which the first end 30 of the cylindrical shaft 28 is engaged. The cylindrical shaft may be welded into position relative to the projection 27.

A fuel receiver 32 is disposed adjacent the fuel inlet 24. The fuel receiver 32 is substantially cylindrical in shape, and extends from the base portion 16 of the housing in a direction towards the second end 18 of the housing. The fuel receiver 32 has a substantially cylindrical side wall 34 and a substantially circular top plate 36. The fuel receiver 32 has an aperture 38 located in the side wall 34 adjacent the top plate 36, and oriented towards the shaft 28. In use, fuel enters the fuel receiver 32 through the fuel inlet 24 and exits through the aperture 38. The fuel receiver 32 may include baffles or sharp edges in order to break any relatively large particle contained in the fuel.

The housing portion 12 further includes a baffle member 60. The baffle member 60 includes a plate portion 62, a separating portion 64 and a top portion 66. The plate portion 62 is substantially annular, and has an outside diameter similar to the internal diameter of the side wall 22 of the housing portion 12 and an internal diameter smaller than the diameter of the lip portion 29 of the projection 27. The separating portion 64 is substantially frusto conical in shape, and extends from the internal diameter of the plate portion 62 towards a central axis of the baffle member 60. The top portion 66 is substantially annular, and extends inwardly of the separating portion 64 with an internal diameter similar to the diameter of the cylindrical shaft 28. In use, the baffle member 60 locates around the cylindrical shaft 28 with the top portion 66 oriented towards the second end 18 of the housing 12, and the plate portion 62 in contact with the lip portion 29 of the projection 27. The plate portion 62 includes apertures 68 which allow fuel or oil to pass through the plate portion 62.

The filtering portion 14 includes a roll of paper 40 having a first end 42 and a second end 44. The roll of paper 40 is wound around a hollow tube 46. The tube 46 may be composed of cardboard. The outside diameter of the roll of paper is substantially similar to the interior diameter of the housing 12.

The filtering portion 14 further includes a first cover member 48 and a second cover member 50. The cover members 48, 50 are of a substantially disc like configuration, and have a similar diameter to the roll of paper 40. The first and second cover members 48, 50 are arranged at the first and second ends respectively of the roll of paper 40, and include apertures 51 located, in use, adjacent the roll of paper 40. The cover members 48, 50 each include a centrally disposed sealing portion 52. The sealing portions 52 are substantially frusto-conical in shape and extend in use from each cover member 48, 50 internally of the hollow tube 46. The sealing portions 52 are arranged such that the diameter of each sealing portion 52 where the sealing portion 52 meets the respective cover member 48, 50 is similar to the diameter of the hollow tube 46.

The filtering portion 14 further includes a sealing tube 70. The sealing tube 70 is substantially cylindrical in shape, and includes a first end 72 and an externally threaded second end 74. The sealing tube 70 is of substantially similar external diameter to the internal diameter of the sealing portions 52. Extending radially around the first end 72 of the sealing tube 70 is an annular base member 76. The annular base member 76 has an external diameter slightly larger than the diameter of the hollow tube 46. In use, the sealing tube 70 is arranged about the cylindrical shaft 28 with the annular base member 76 in contact with the top portion 66 of the baffle member 60. The first cover member 48, the roll of paper 40 and the second cover member 50 are arranged along the sealing tube 70 from the first end 72 to the second end 74.

The filtering portion 14 still further includes a clamping member 80 and a sealing nut 82. The clamping member 80 is substantially flat and hexagonal in shape, and includes an internally threaded, centrally disposed aperture 84. The aperture 84 is arranged to threadedly engage with the externally threaded second end 74 of the sealing tube 70.

The sealing nut 82 comprises a substantially cylindrical portion 86 and a frusto-conical portion 88. The sealing nut 82 includes a centrally disposed, internally threaded aperture 90 which is arranged to threadedly engage with the second end 31) of the cylindrical shaft 28. In use, the frusto-conical portion 88 is oriented towards the first end 29 of the cylindrical shaft 28 such that a peak of the frusto-conical portion 88 is engaged within the second end 31 of the sealing tube 70.

The housing 12 further includes a cap portion 94. The cap portion 94 comprises a lid portion 96, a handle portion 98 and a resilient sealing member 100. The lid portion 96 is substantially flat and circular, and has an external diameter slightly greater than the diameter of the side wall 22 of the housing 12. The lid portion 96 has an inner surface 102 oriented, in use, towards the first end 16 of the housing 12 and an outer surface 104 oriented, in use, away from the housing 12. The inner surface 102 includes an annular recess 106 extending inwardly of the surface 102 near an outer edge of the inner surface 102. The diameter of the recess 106 is equal to that of the side wall 22 of the housing 12. The recess 106 is arranged to receive the resilient sealing member 100.

The lid portion 96 further includes a centrally disposed aperture 108.

The handle portion 98 comprises a first cylindrical portion 110, a second cylindrical portion 112 and a rod portion 114. The first cylindrical portion 110 is of the same diameter as the aperture 108 of the lid portion 96, and locates, in use, within the aperture 108. The second cylindrical portion 112 is of larger diameter than the aperture 108, and locates in use adjacent the outer surface 104 of the lid portion 96. The rod portion 114 extends from the second cylindrical portion 112 in a direction transverse to a longitudinal axis of the first and second cylindrical portions 110, 112. An internally threaded aperture 116 extends inwardly of the first and second cylindrical portions 110, 112 along their longitudinal axis. The internally threaded aperture 116 is arranged to engage, in use, with the second end 31 of the cylindrical shaft 28. A resilient ring seal may be provided between the second cylindrical portion 112 and the outer surface 104.

The roll of paper 40 is preferably constructed from virgin paper fibre. The properties of the virgin paper fibre are typically as follows:

| | |
|---|---|
| Weight: | In the range 30 GSM to 60 GSM. Preferably in the range 40 GSM to 50 GSM. Particularly preferably about 42 GSM. |
| Thickness: | In the range 153 μm to 100 μm. Preferably in the range 125 μm to 175 μm. Particularly preferably about 153 μm. |
| Pulp Composition: | 27% bi sulphide pine, chlorine free, manufactured using magnesium sulphide process |
| | 35% Thermo Mechanical Pulp, mechanical ground for fibre pulp |
| | 35% Unbleached Pulp |
| | Balance broke, recycling of virgin pulp. |
| Tensile strength: | MD 65 (factor) |
| | Machine direction strength 65 (internal test 4 × 75 mm paper tear factor). |
| | CD (Cross direction) 30 |
| | Wet strength factor 7 |
| | Stretch factor 8% |
| Appearance | 52% Brightness (Hunter Lab Test) |
| Chemicals | Base pulps, thermo mechanical measures |
| | Main chemical magnesium sulphide, totally chlorine free. |

Figure 3:
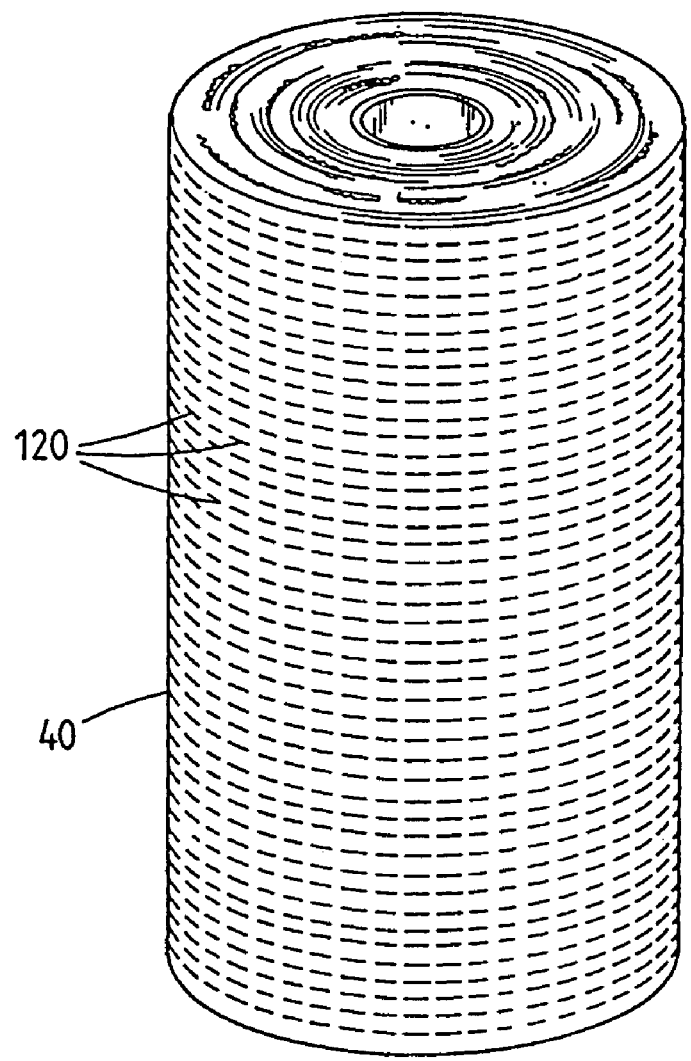
FIG. 3 is a perspective view of a roll of paper used in the filtering device of FIG. 1.
Figure 4:
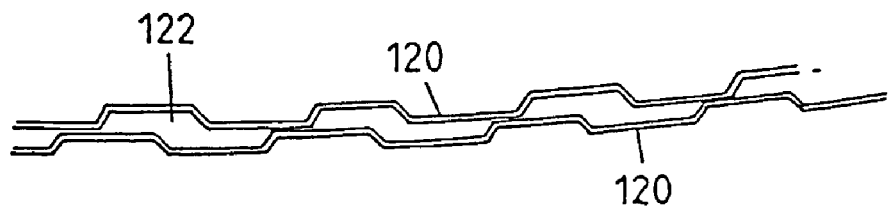
FIG. 4 is an enlarged view of a portion of a cross sectional view of the roll of paper shown in FIG. 3.
Figure 5:
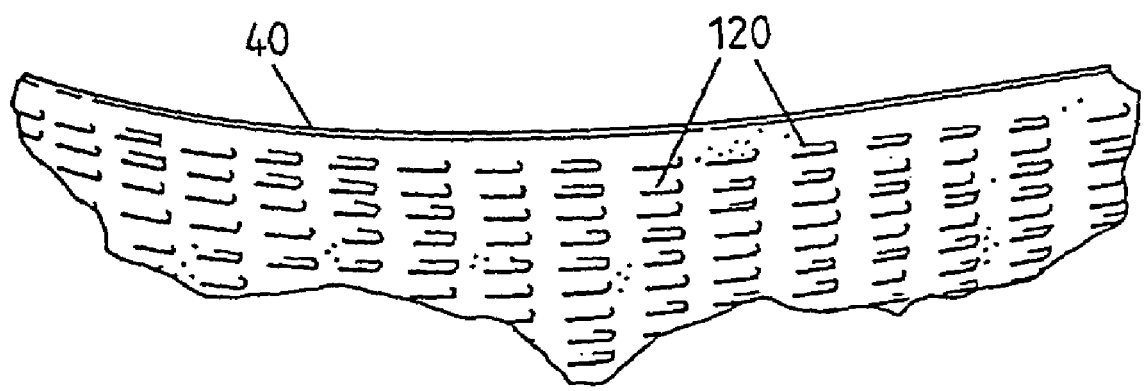
FIG. 5 is a plan view of the surface of the roll of paper shown in FIG. 3.

The roll of paper 40 is further embossed with small, circumferentially aligned projections 120 as shown in FIG. 3. The projections 120 appear in the roll of paper 40 as small, circumferentially aligned cavities 122 as shown in FIG. 4.

The projections 120 may be substantially rectangular in shape, with dimensions of about 2 mm×0.5 mm. The projections 120 may be arranged in an array with a gap of about 2 mm between each adjacent projection 120. The depth of each projection 120 may be about 1 mm.

The roll of paper 40 may be impregnated with an additive substance which is required to leech into the substance being filtered. The additive substance may, by way of example, be an oil additive.

To prepare for use, the filtering device 10 is arranged with the cylindrical shaft 28 extending from the projection 27 of the housing 12 as described hereinabove. Disposed about the cylindrical shaft 28 are the baffle member 60 adjacent the projection 27, then the sealing tube 70, first cover member 48, the roll of paper 40, the second cover member 50, the clamping member 80 and the sealing nut 82. The sealing nut may then be tightened in order for the first cover member 48 to seal against the base member 76 of the sealing tube 70 and the second cover member 50 to seal against the clamping member 80. The cap portion 94 is then sealingly fitted to the housing 12 by engagement of the second end 31 of the cylindrical shaft 28 in the internally threaded aperture 116 of the cap portion 94.

In use, fuel is fed to the filtering device 10 through the inlet 24 into the fuel receiver 32. As it passes through the fuel receiver 32 relatively large particles may be broken down as they pass over the sharp edges therein. The fuel leaves the fuel receiver 32 through the aperture 38 and then passes through the baffle 60. The fuel then passes through the apertures 51 of the first cover member 48 and into the roll of paper 40.

As the fuel passes through the roll of paper it passes through numerous cavities 122.

Whilst passing through these cavities 122, small particles are retained within cavities 122, and are thus filtered from the fuel. Some contaminants such as water may be leeched from the fuel and absorbed by the paper through which the fuel is passing.

The fuel exits the paper through the apertures 51 in the second cover member 50, and then exits the filtering device 10 through the fuel outlet 26.

Where the filtering device 10 is arranged to filter oil, the flow of the oil may be from the second end 18 of the filtering device 10 to the first end 16. In this embodiment of the invention, it may not be necessary to include the fuel receiver 32 or the baffle member 60. The flow rate of oil is typically between three and seven liters per minute.

Modifications and variations as would be apparent to a skilled addressee are deemed to be within the scope of the present invention.

The invention claimed is:

1. A liquid filtering apparatus comprising a housing having, in a longitudinal direction, a first end and a second end, a side wall interconnecting the first end and the second end of the housing, a liquid inlet adjacent the first end of the housing, a liquid outlet adjacent the second end of the housing; a cylindrical shaft longitudinally extending between the first end and second end of the housing, and disposed centrally of the housing; a longitudinally extending imperforate hollow tube having a first end and a second end, and a diameter large enough to fit over the cylindrical shaft; first multi-apertured disc-shaped cover member with a centrally disposed sealing member, the sealing member extending internally and sealing the first end of the hollow tube; a second multi-apertured disc-shaped cover member with a centrally disposed second sealing member, the second sealing member extending internally and sealing the second end of the hollow tube; the side wall, the hollow tube and the cover members defining a filtering cavity, the filtering cavity being filled with a filtering portion, the filtering portion comprising a roll of paper wound around the hollow tube and extending laterally outwardly to the side wall, the first and second cover members being of similar outer diameter to the roll of paper and extending inwardly to the hollow tube, the roll of paper having a first end and a second end, and the roll of paper having a plurality of superimposed paper layers, the paper layers being aligned between the first and the second end, the paper layers being embossed with numerous small circumferentially aligned projections arranged in rows, each projection forming a cavity in the paper, the projections being arranged in an array with a lateral gap between each adjacent row of circumferentially aligned projections, the filtering apparatus defining a fluid channel between the first and second cover members and the hollow tube and the side wall, such that liquid entering through the liquid inlet passes longitudinally through the roll of paper between the layers thereof fi'om the first end to the second end thereof and passes through the lateral gap and the cavities formed by the projections before leaving the filtering apparatus through the liquid outlet.

2. A filtering apparatus according to claim 1, wherein the projections of the roll of paper are substantially rectangular.

3. A filtering apparatus according to claim 2, wherein the projections have dimension about 2 mm ×0.5 mm.

4. A filtering apparatus according to claim 3, wherein the projections are spaced about 2 mm apart.

5. A filtering apparatus according to claim 4, wherein the projections have a depth of about 1 mm.

6. A filtering apparatus according to claim 2, wherein the paper thickness is about 153 µm.

7. A filtering apparatus according to claim 1, wherein the paper of the roll of paper is water absorbent.

8. A filtering apparatus according to claim 1, wherein the paper of the roll of paper is constructed from virgin paper fiber.

9. A filtering apparatus according to claim 8, wherein the paper is composed of about 27% bisulphide pine.

10. A filtering apparatus according to claim 9, wherein the paper is chlorine free.

11. A filtering apparatus according to claim 10, wherein the paper is manufactured using the magnesium sulphide process.

12. A filtering apparatus according to claim 8, wherein the paper thickness is in the range of 100 µm to 200 µm.

13. A filtering apparatus according to claim 12, wherein the paper thickness is in the range of 125 µm to 175 µm.

14. A filtering apparatus according to claim 8, wherein the paper weight is in the range of 30 GSM to 50 GSM.

15. A filtering apparatus according to claim 14, wherein the paper weight is in the range of 40 GSM to 60 GSM.

16. A filtering apparatus according to claim 15, wherein the paper weight is about 42 GSM.

17. A filtering apparatus according to claim 1, wherein the paper of the roll of paper is impregnated with an additive substance.

18. A filtering apparatus according to claim 1, wherein the longitudinally extending imperforate hollow tub is composed of cardboard.

* * * * *

UNITED STATES PATENT AND TRADEMARK OFFICE
CERTIFICATE OF CORRECTION

PATENT NO. : 7,380,676 B2  
APPLICATION NO. : 10/399598  
DATED : June 3, 2008  
INVENTOR(S) : Colin James Rynbeck It is certified that error appears in the above-identified patent and that said Letters Patent is hereby corrected as shown below:

In column 6, line 1, please delete "fi'om" and replace it with --from--.

In column 6, line 42, please delete "tub" and replace it with --tube--.

Signed and Sealed this

Twenty-sixth Day of August, 2008

JON W. DUDAS  
*Director of the United States Patent and Trademark Office*